(12) United States Patent
Sarangdhar et al.

(10) Patent No.: US 12,699,374 B2
(45) Date of Patent: Aug. 4, 2026

(54) SYSTEMS AND METHODS FOR AUTOMATICALLY PAIRING AN INFORMATION HANDLING SYSTEM (IHS) WITH A SELECTED ONE OF A PLURALITY OF WORKSPACE MANAGING DEVICES (WMDS) IN A SHARED WORK ENVIRONMENT

(71) Applicant: Dell Products, L.P., Round Rock, TX (US)

(72) Inventors: Nitin Sarangdhar, Portland, OR (US); Andrew Thomas Sultenfuss, Leander, TX (US); Marcin M. Nowak, Round Rock, TX (US)

(73) Assignee: Dell Products, Round Rock, TX (US)

( * ) Notice: Subject to any disclaimer, the term of this patent is extended or adjusted under 35 U.S.C. 154(b) by 528 days.

(21) Appl. No.: 18/192,889

(22) Filed: Mar. 30, 2023

(65) Prior Publication Data

US 2024/0329616 A1 Oct. 3, 2024

(51) Int. Cl.
| | |
|---|---|
| *G05B 19/05* | (2006.01) |
| *G06F 9/4401* | (2018.01) |
| *G06F 13/38* | (2006.01) |

(52) U.S. Cl.
CPC ............ *G05B 19/05* (2013.01); *G06F 9/4411* (2013.01); *G06F 13/385* (2013.01)

(58) Field of Classification Search
CPC ...... G05B 19/05; G06F 9/4411; G06F 13/385
See application file for complete search history.

(56) References Cited

FOREIGN PATENT DOCUMENTS

| | | | | |
|---|---|---|---|---|
| CN | 103687056 B | * | 6/2017 | ............ H04W 76/02 |
| JP | 2013546255 A | * | 12/2013 | .............. H02J 50/10 |
| KR | 102397287 B1 | * | 5/2022 | .......... H02J 7/00034 |

* cited by examiner

*Primary Examiner* — Zhitong Chen
(74) *Attorney, Agent, or Firm* — Fogarty LLP

(57) ABSTRACT

Systems and methods for automatically pairing an Information Handling System (IHS) to a selected one of a plurality of Workspace Managing Devices (WMDs) in a shared work environment are described. In an illustrative, non-limiting embodiment, an IHS may include an Embedded Controller (EC) and a memory coupled to the EC, the memory having program instructions stored thereon that, upon execution by the EC, cause the IHS to: perform a first wireless communication with a charging mat coupled to one of a plurality of WMDs disposed in a shared work environment, and establish a wireless connection with the WMD based, at least in part, upon first information exchanged over the first wireless communication.

16 Claims, 5 Drawing Sheets

200

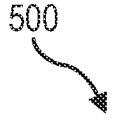

500

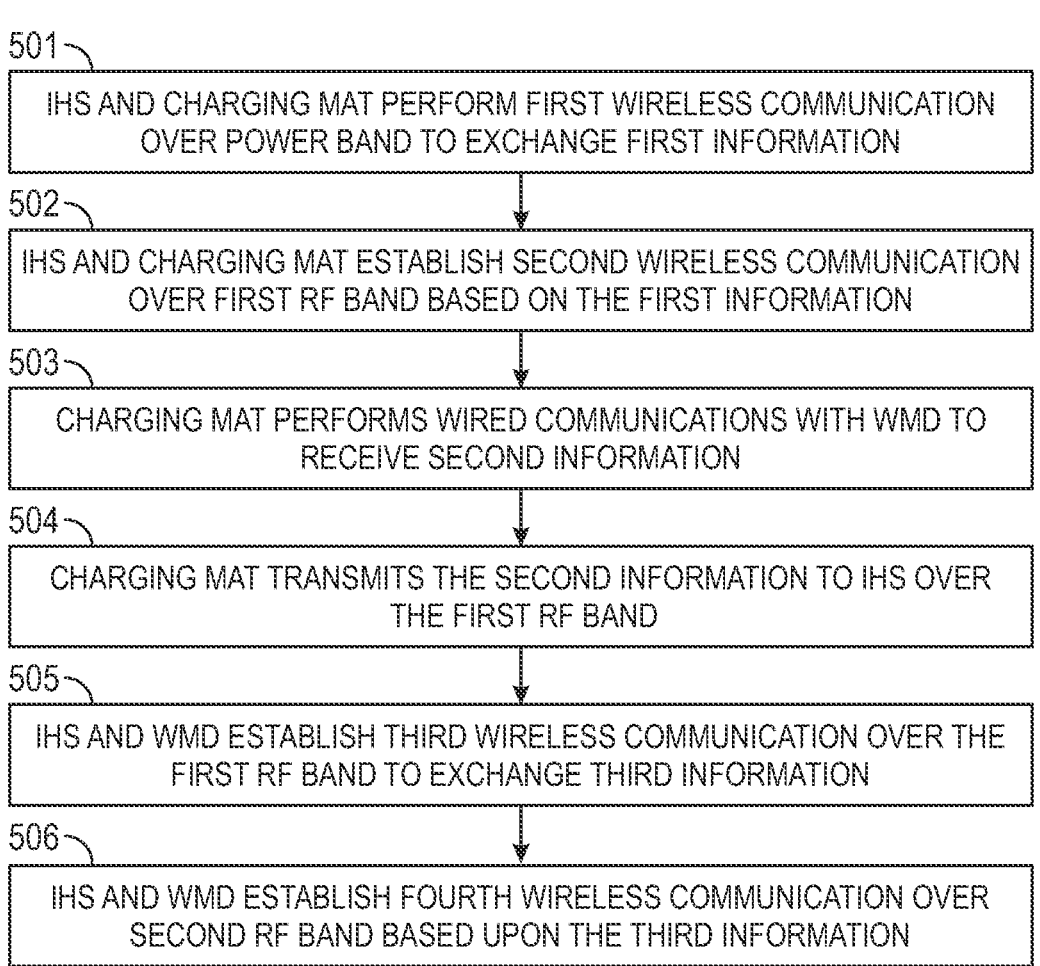

501 —
IHS AND CHARGING MAT PERFORM FIRST WIRELESS COMMUNICATION OVER POWER BAND TO EXCHANGE FIRST INFORMATION

502 —
IHS AND CHARGING MAT ESTABLISH SECOND WIRELESS COMMUNICATION OVER FIRST RF BAND BASED ON THE FIRST INFORMATION

503 —
CHARGING MAT PERFORMS WIRED COMMUNICATIONS WITH WMD TO RECEIVE SECOND INFORMATION

504 —
CHARGING MAT TRANSMITS THE SECOND INFORMATION TO IHS OVER THE FIRST RF BAND

505 —
IHS AND WMD ESTABLISH THIRD WIRELESS COMMUNICATION OVER THE FIRST RF BAND TO EXCHANGE THIRD INFORMATION

506 —
IHS AND WMD ESTABLISH FOURTH WIRELESS COMMUNICATION OVER SECOND RF BAND BASED UPON THE THIRD INFORMATION

SYSTEMS AND METHODS FOR AUTOMATICALLY PAIRING AN INFORMATION HANDLING SYSTEM (IHS) WITH A SELECTED ONE OF A PLURALITY OF WORKSPACE MANAGING DEVICES (WMDS) IN A SHARED WORK ENVIRONMENT

FIELD

This disclosure relates generally to Information Handling Systems (IHSs), and more specifically, to systems and methods for automatically pairing an IHS with a selected one of a plurality of Workspace Managing Devices (WMDs) in a shared work environment.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

In modern enterprises, the term "hoteling," "office hoteling," "shared workspaces," or "co-working spaces" collectively refer to physical environments where clients, users, or employees can schedule their hourly, daily, or weekly use of individual spaces, such as office desks, cubicles, or conference rooms-thus serving as an alternative to conventional, permanently assigned seating.

Typically, hoteling clients, users, or employees access a reservation system to book an individual space (e.g., a desk, a cubicle, a conference room, an office, etc.) before they arrive at work, which gives them freedom and flexibility to work wherever they want to. In other cases, however, individual spaces may also be available to users without a reservation system on a first-come, first-serve basis (e.g., in the lobby of a hotel, in an airport, or in a library).

When a client, user, or employee arrives at a particular workspace, their IHS may be coupled to one or more shared peripheral devices (e.g., one or more external displays, a camera, loudspeakers, etc.) via a Workspace Managing Device (WMD), such as a dock, a docking station, an intelligent hub, an external display, a wireless Keyboard, Video, and Mouse (KVM) switch, etc. An WMD may also provide its respective IHS with a connection to an Access Point (AP) for network (e.g., Internet) access.

As the inventors hereof have recognized, however, in a shared workspace with multiple IHSs and WMDs, due to the nature of most wireless protocols, an IHS may inadvertently connect to a neighboring WMD (or vice-versa) that has not been assigned to them, which can be a disruptive experience. To address these, and other issues, systems and methods for automatically pairing an IHS with a selected one of a plurality of WMDs in a shared work environment are described.

SUMMARY

Systems and methods for automatically pairing an Information Handling System (IHS) to a selected one of a plurality of Workspace Managing Devices (WMDs) in a shared work environment are described. In an illustrative, non-limiting embodiment, an IHS may include an Embedded Controller (EC) and a memory coupled to the EC, the memory having program instructions stored thereon that, upon execution by the EC, cause the IHS to: perform a first wireless communication with a charging mat coupled to one of a plurality of WMDs disposed in a shared work environment, and establish a wireless connection with the WMD based, at least in part, upon first information exchanged over the first wireless communication.

For example, the first wireless communication may be performed over a power band usable by the charging mat to charge a battery internal to the IHS. The first information may include a BLUETOOTH address or device identifier associated with the IHS.

The program instructions, upon execution, may cause the IHS to establish a second wireless communication with the charging mat over a first Radio Frequency (RF) band distinct from the power band based, at least in part, upon the first information. The first RF band may include a BLUETOOTH frequency band.

The program instructions, upon execution, may cause the IHS to transmit or receive, to or from the charging mat, second information usable to establish a third wireless communication with the WMD. The second information may include a BLUETOOTH address or device identifier associated with the WMD.

The program instructions, upon execution, may cause the IHS to exchange third information with the WMD as part of the third wireless communication. The third information may include at least one of: (i) a WIFI address or WIFI device identifier associated with the IHS, or (ii) another WIFI address or WIFI device identifier associated with the WMD.

The program instructions, upon execution, may cause the IHS to establish the wireless connection over a second RF band distinct from the first RF band based, at least in part, upon the third information. The second RF band comprises a WIFI frequency band. The wireless connection may be usable to transmit video from the IHS to the WMD.

In another illustrative, non-limiting embodiment, a memory device may have program instructions stored thereon that, upon execution by a processor of a WMD, cause the WMD to: transmit or receive, to or from a charging mat coupled to the WMD, information usable to establish a first wireless connection over a first RF band with an IHS disposed in proximity to the charging mat; and establish the first wireless connection based, at least in part, upon the information.

The information may include at least one of: (i) a BLUETOOTH address or device identifier associated with the IHS, or (ii) another BLUETOOTH address or device identifier associated with the WMD.

The program instructions, upon execution, may cause the WMD to transmit or receive, to or from the IHS, second information over the first wireless connection, where the second information is usable by the WMD to establish a second wireless connection with the IHS over a second RF band. For instance, the second information may include at least one of: (i) a WIFI address or WIFI device identifier associated with the IHS, or (ii) another WIFI address or WIFI device identifier associated with the WMD. The program instructions, upon execution, may cause the WMD to provide a video signal received from the IHS over the second wireless connection to a display coupled to the WMD.

In another illustrative, non-limiting embodiment, a method may include detecting the presence of an IHS at a given one of a plurality of shareable workspaces using a charging mat coupled to a WMD assigned to the given workspace and, in response to the detection, enabling usage by the IHS of a peripheral device coupled to the WMD.

The method may also include, prior to enabling usage of the peripheral device, verifying, against a reservation system, that the IHS is assigned to the given workspace. For example, the peripheral device may include a display.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 5 is a flowchart illustrating an example of a method for automatically pairing an IHS with a selected one of a plurality of WMDs in a shared work environment, according to some embodiments.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
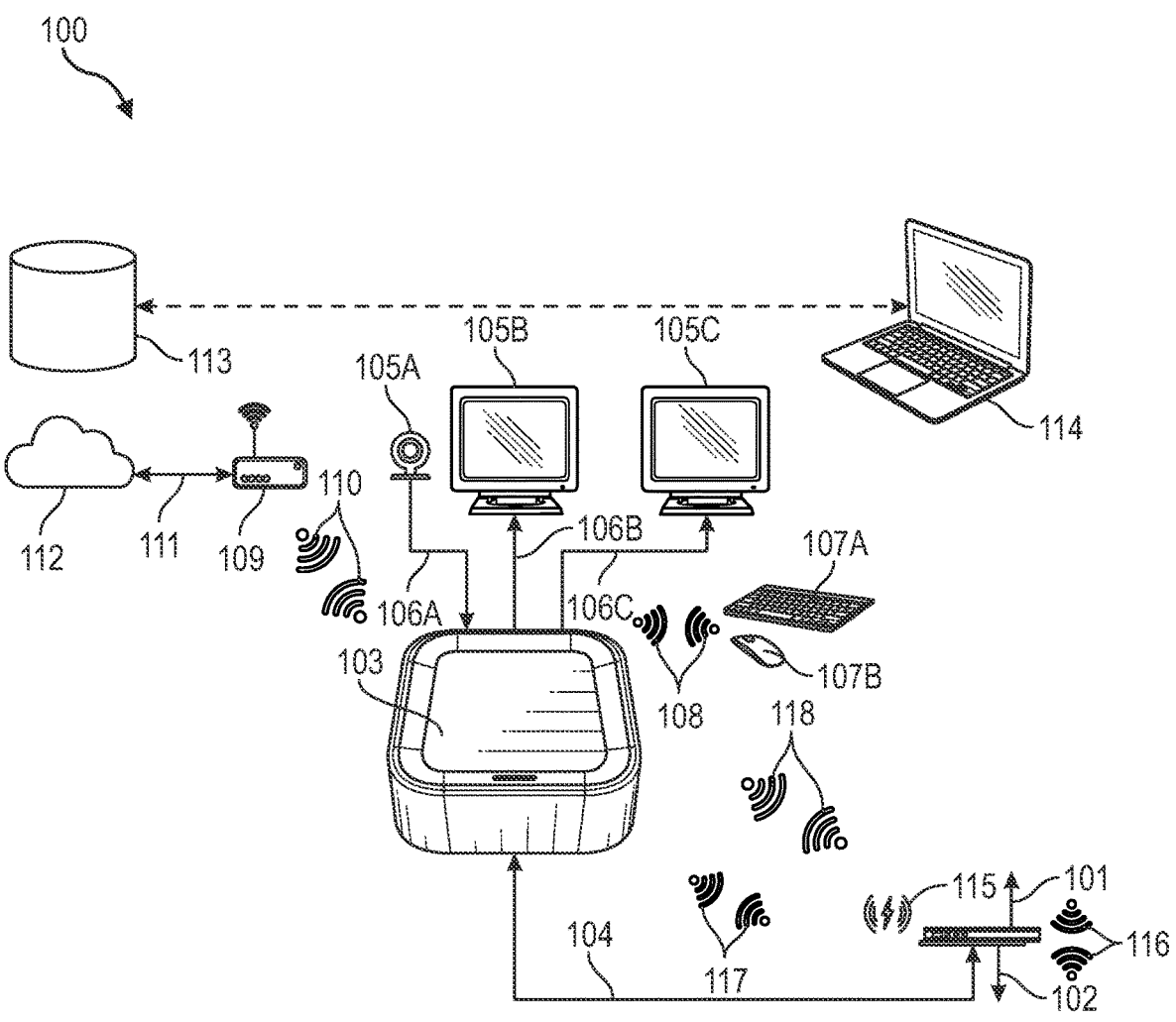
FIG. 1 is a diagram illustrating an example of a shared workspace having a Workspace Managing Device (WMD), according to some embodiments.

FIG. 1 is a diagram illustrating an example of shared workspace 100 (among a plurality of shared workspaces) having Workspace Managing Device (WMD) 103 disposed therein. In various implementations, WMD 103 may be a wireless dock, docking station, intelligent hub, external display, wireless Keyboard, Video, and Mouse (KVM) switch, etc.

As shown, WMD 103 is coupled to wireless charging mat or pad 102 (or any wireless charger with any other suitable form factor) through a wire (e.g., a Universal Serial Bus-Type C or "USB-C" cable, etc.) and/or wirelessly (over BLUETOOTH or "BT," BT LOW ENERGY or "BLE," ZIGBEE, Z-WAVE, WIFI, WI-FI DIRECT, etc.). WMD is also coupled to webcam 105A, first display 105B, and second display 105C through wires 106A-C (e.g., using a DISPLAYPORT or "DP," USB-C, High-Definition Multimedia Interface or "HDMI," etc.), respectively.

Moreover, WMD 103 is coupled to input devices 107A and 107B over a wireless connection(s) 108 (e.g., BT, WIFI DIRECT, proprietary Radio Frequency or "RF," etc.), as well as Access Point (AP) or wireless router 109 over wireless connection 110 (e.g., WIFI). AP 109 provides WMD 103 with access to network or Internet 112, for example, over Ethernet cable 111, or the like.

Prior to using shared workspace 100, a user operating IHS 114 may have communicated with workspace reservation database 113 to reserve a selected one of a plurality of available workspaces (e.g., shared workspace 100). Meanwhile, WMD 103 may access workspace reservation database 113, for example, to receive information about which IHSs have been assigned to it, as well as digital certificates, firmware updates, etc. provided by other remote services via AP 109.

When a user arrives at shared environment 100 with IHS 101, they may place IHS 101 atop wireless charging mat 102 to perform an induction changing operation using any suitable wireless charging protocol (e.g., Qi or the like).

As described in more detail below, in a non-limiting embodiment, IHS 101, wireless charging mat 102, and/or WMD 103 may be configured to establish one or more of: (i) wireless communications 115 between IHS 101 and wireless charging mat 102 over a power band (e.g., 110 to 205 KHz for the low power chargers, 80 to 300 kHz for medium power chargers, etc.); (ii) first wireless connection 116 (e.g., BT) between IHS 101 and wireless charging mat 102 over a first RF band (e.g., 2.4 to 2.48 GHZ); (iii) second wireless connection 117 (e.g., BT) between IHS 101 and with WMD 103 over the first RF band; and (iv) third wireless connection 118 between IHS 101 and WMD 103 (e.g., WIFI) over a second RF band (e.g., 2.4, 5, or 6 GHZ, etc.).

In various embodiments, by performing the establishing connections (i)-(iv), systems and methods described herein enable a wireless connection between IHS 101 and WMD 103 in shared workspace 100 through an unambiguous pairing process.

Figure 2:
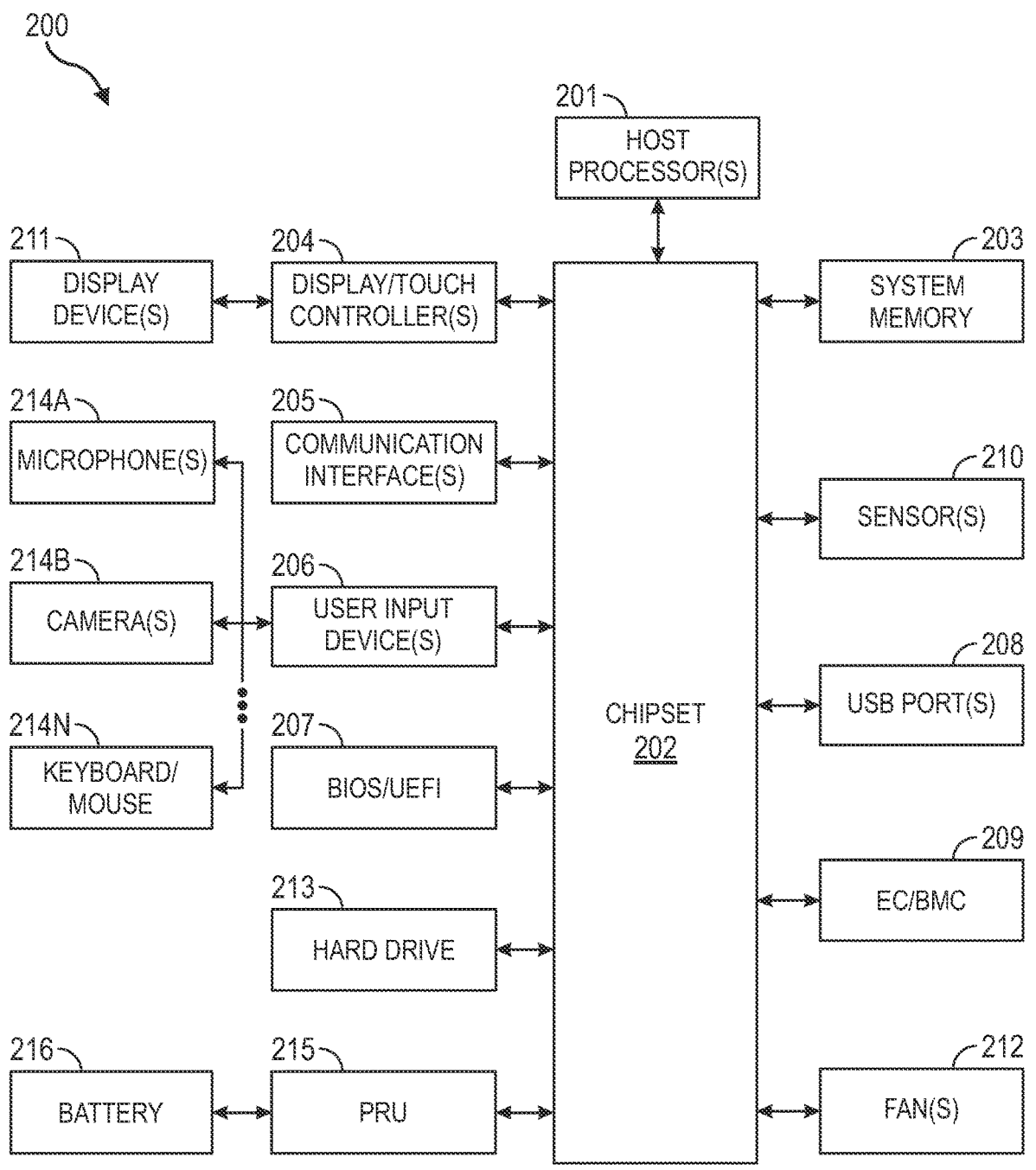
FIG. 2 is a diagram illustrating examples of components of an Information Handling System (IHS), according to some embodiments.

FIG. 2 is a diagram illustrating examples of IHS components 200, which may be used to implement IHSs 101 and 114, and/or WMD 103 (FIG. 1).

As depicted, components 200 of IHS 101 include host processor(s) 201. In various embodiments, IHS 101 may be a single-processor system, a multi-processor system including two or more processors, and/or a heterogeneous computing platform. Host processor(s) 201 may include any processor capable of executing program instructions, such as a PENTIUM processor, or any general-purpose or embedded processor implementing any of a variety of Instruction Set Architectures (ISAs), such as an x86 or a Reduced Instruction Set Computer (RISC) ISA (e.g., POWERPC, ARM, SPARC, MIPS, etc.).

IHS 101 includes chipset 202 coupled to host processor(s) 201. Chipset 202 may provide host processor(s) 201 with access to several resources. In some cases, chipset 202 may utilize a QuickPath Interconnect (QPI) bus to communicate with host processor(s) 201.

Chipset 202 may also be coupled to communication interface(s) 205 to enable communications between IHS 101 and various wired and/or wireless networks, such as Ethernet, WIFI, WIFI DIRECT, BT, BT Low Energy (BLE), cellular or mobile networks (e.g., Code-Division Multiple Access or "CDMA," Time-Division Multiple Access or "TDMA," Long-Term Evolution or "LTE," etc.), satellite networks, or the like. Moreover, communication interface(s) 205 may also be used to communicate with certain peripherals devices (e.g., BT speakers, microphones, headsets, etc.) as well as wireless charging mat 102 and AP 109. In some cases, communication interface(s) 205 may be coupled to chipset 202 via a Peripheral Component Interconnect Express (PCIe) bus, or the like.

Chipset 202 may be further coupled to display/touch controller(s) 204, which may include one or more or Graphics Processor Units (GPUs) on a graphics bus, such as an Accelerated Graphics Port (AGP) or PCIe bus. As shown, display/touch controller(s) 204 provide video or display signals to one or more display device(s) 211. Display device(s) 211 may include Liquid Crystal Display (LCD), Light Emitting Diode (LED), organic LED (OLED), or other thin film display technologies. Moreover, display device(s) 211 may include a plurality of pixels arranged in a matrix, configured to display visual information, such as text, two-dimensional images, video, three-dimensional images, etc. In some cases, display device(s) 211 may be provided as a single continuous display, or as two or more discrete displays.

Chipset 202 may provide host processor(s) 201 and/or display/touch controller(s) 204 with access to system memory 203. In various embodiments, system memory 203 may be implemented using any suitable memory technology, such as static RAM (SRAM), dynamic RAM (DRAM) or magnetic disks, or any nonvolatile/Flash-type memory, such as a solid-state drive (SSD) or the like.

Chipset 202 may also provide host processor(s) 201 with access to one or more Universal Serial Bus (USB) port(s) 208, to which one or more peripheral devices may be coupled (e.g., integrated or external webcams, microphones, speakers, etc.). Chipset 202 may further provide host processor(s) 201 with access to one or more hard disk drives, solid-state drives, optical drives, or other removable-media drive(s) 213.

Chipset 202 may further provide host processor(s) 201 with access to user input device(s) 206, for example, using a super I/O controller or the like. Examples of user input devices 206 include, but are not limited to, microphone(s) 214A, camera(s) 214B, and keyboard/mouse 214N. Other user input device(s) 206 may include a touchpad, trackpad, stylus or active pen, dial totem, etc. Each of user input device(s) 206 may include a respective controller (e.g., a touchpad may have its own touchpad controller) that interfaces with chipset 202 through a wired or wireless connection (e.g., via communication interfaces(s) 205). In some cases, chipset 202 may also provide access to one or more user output devices (e.g., video projectors, paper printers, 3D printers, loudspeakers, audio headsets, Virtual/Augmented Reality (VR/AR) devices, etc.).

In certain embodiments, chipset 202 may also provide host processor(s) 201 with an interface for communications with sensor(s) 210. Sensor(s) 210 may be disposed on or within the chassis of IHS 101, or otherwise coupled to IHS 101, and may include, but are not limited to: electric, magnetic, radio, optical (e.g., camera, webcam, etc.), light (e.g., Ambient Light Sensor or "ALS"), infrared, thermal (e.g., thermistors, etc.), force, pressure, acoustic (e.g., microphone), ultrasonic, proximity (e.g., User Presence Detection or "UPD" sensor, infrared, time-of-flight or "ToF" sensor, etc.), position, deformation, bending, direction, gaze, eye tracking, body movement, velocity, rotation, gyroscope, Inertial Measurement Unit (IMU), acceleration sensor(s), etc.

Upon booting of IHS 101, host processor(s) 201 may utilize program instructions of Basic Input/Output System (BIOS)/Unified Extensible Firmware Interface (UEFI) 207 to initialize and test hardware components coupled to IHS 101 and to load a host Operating System (OS) (e.g., WINDOWS, MAC OS, LINUX, CHROME OS, IOS, etc.) for use by IHS 101. BIOS/UEFI 207 provides an abstraction layer that allows the host OS to interface with certain IHS components 200. Relying upon the hardware abstraction layer provided by BIOS/UEFI 207, software stored in system memory 203 and executed by host processor(s) 201 can interface with certain I/O devices that are coupled to IHS 101.

Embedded Controller (EC) or Baseboard Management Controller (BMC) 209 is operational from the very start of each IHS power reset and handles various tasks not ordinarily handled by host processor(s) 201. Examples of these operations may include, but are not limited to: receiving and processing signals from a keyboard or touchpad, as well as other buttons and switches (e.g., power button, laptop lid switch, etc.), receiving and processing thermal measurements (e.g., performing fan control, CPU and GPU throttling, and emergency shutdown), controlling indicator LEDs (e.g., caps lock, scroll lock, num lock, battery, power, wireless LAN, sleep, etc.), managing Power Receiving Unit (PRU) 215 and/or battery 216, allowing remote diagnostics and remediation over network(s), etc.

Firmware instructions utilized by EC/BMC 209 may also be used to provide various core operations of IHS 101, such as power management and management of certain modes of IHS 101 (e.g., turbo modes, maximum operating clock frequencies of certain components, etc.).

IHS components 200 may also include internal or external battery 216. Battery 216 may include, for example, a Lithium-ion (Li-ion) rechargeable device capable of storing energy sufficient to power IHS 101 for an amount of time, depending upon the IHS's workloads, environmental conditions, etc. In some cases, a battery pack may also contain temperature sensors, voltage regulator circuits, voltage taps, and/or charge-state monitors. For example, battery 216 may include a current limiter, or the like.

Power Receiving Unit (PRU) 215 may be responsible for certain power functions of IHS 101, which may include running certain components of IHS 101 and/or charging of battery 216 based using power received from wireless charging mat 102. Accordingly, PRU 215 may include receiver (Rx) coils configured to engage in communications with transmitter (Tx) coils of Power Transmitting Unit (PTU) 307 (FIG. 3) within wireless charging mat 102.

In operation, PRU 215 may communicate with EC/BMC 209 to provide information about wireless charging mat 102. For example, such information can include a class of the wireless charging mat 102, an amount of power that wireless charging mat 102 can provide, a type of wireless charging mat 102, and the like. EC/BMC 209 may use this information to detect whether wireless charger module 102 is compatible with a power system of IHS 101. When EC/BMC 209 determines that wireless charging mat 102 is compatible with IHS 101, EC/BMC 209 may set IHS 101 in a ready state to receive power from wireless charging mat 102.

PRU 215 may use one or more techniques to receive power wirelessly, including inductive techniques, resonant inductive techniques, capacitive transfer techniques, beamed power transfer, such as laser or microwave transfer, etc. PRU 215 may then convert power received from wireless charging mat 102 to a power level and a voltage level that can be utilized by IHS 101 and/or battery 216, such as, for example, 45 or 65 W, and 19.5 V.

IHS components 200 may also include one or more fans 212 configured to cool down one or more components or devices of IHS 101 disposed inside a chassis, case, or housing. Fan(s) 212 may include any fan inside, or attached to, IHS 101 and used for active cooling. Fan(s) 212 may be used to draw cooler air into the case from the outside, expel warm air from inside, and/or move air across a heat sink to cool a particular component. In various embodiments, both axial and sometimes centrifugal (blower/squirrel-cage) fans may be used.

In other embodiments, IHS 101 may not include all of components 200. In other embodiments, IHS 101 may include other components in addition to components 200. Furthermore, some components that are represented as separate components in FIG. 2 may instead be integrated with other components, such that all or a portion of the operations executed by the illustrated components may instead be executed by the integrated component.

For example, in various embodiments described herein, host processor(s) 201 and/or other components of IHS 101 (e.g., chipset 202, display/touch controller(s) 204, communication interface(s) 205, EC/BMC 209, etc.) may be replaced by devices integrated within a heterogeneous computing platform or Systems-on-Chip (SoC). As such, IHS 101 may assume different form factors including, but not limited to: servers, workstations, desktops, laptops, appliances, video game consoles, tablets, smartphones, etc.

Figure 3:
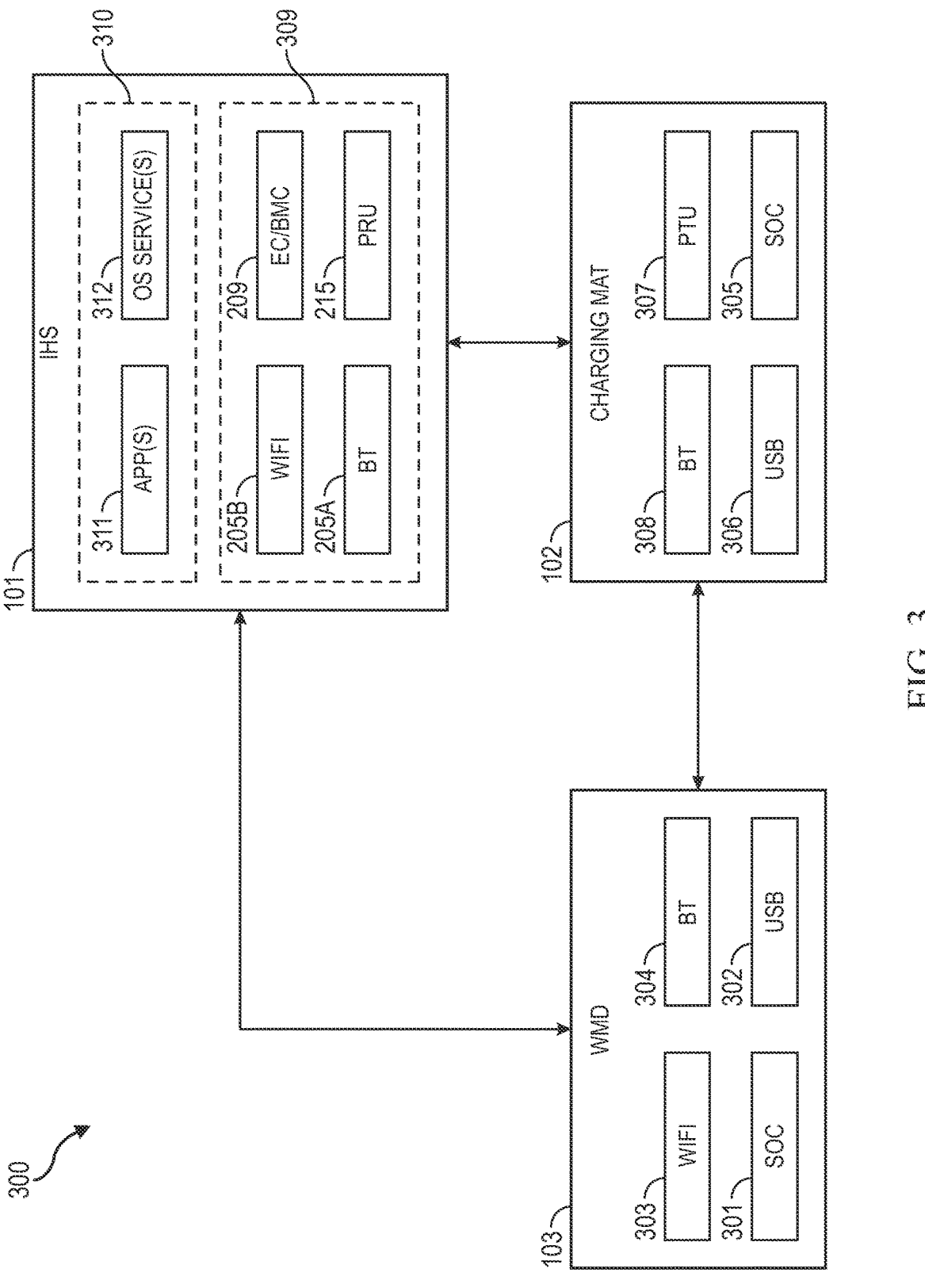
FIG. 3 is a diagram illustrating examples of components of a system for automatically pairing an IHS with a selected one of a plurality of WMDs in a shared work environment, according to some embodiments.

FIG. 3 is a diagram illustrating examples of components of system 300 for automatically pairing IHS 101 to WMD 103 in shared work environment 100.

As shown, WMD 103 may include SoC 301, USB controller or module 302, WIFI controller or module 303, and BT controller or module 304. Wireless charging mat 102 may include SoC 305, USB controller or module 306, PTU 307, and BT controller or module 308. IHS 101 may include BT controller or module 205A, WIFI controller or module 305B, EC/BMC 209, and PRU 215, each of these components having program instructions residing in firmware and/or kernel space 309, as well as OS service(s) 310 and application(s) 311, which may be instantiated in user space 310.

In operation, PTU 307 of wireless charging mat 102 may be connected to WMD 103 via USB-C cable 104, for example, and IHS 101 equipped with PRU 215 may be placed on or near wireless charging mat 102. IHS 101 may then connect to WMD 103, at least in part, through wireless charging mat 102, thereafter allowing BT and WIFI interfaces to complete the final wireless connection between them.

Particularly, IHS 101 may use PRU 215 to communicate with PTU 307 of wireless charging mat 102 via power band 115 to charge battery 216 and/or to exchange first information (e.g., BT identification or "ID," such as a Media Access Control or "MAC" address or "BD_ADDR," a service tag, a device ID, etc.) usable to establish first wireless connection 216 between BT controller or module 205A and BT controller or module 308, or to otherwise pair IHS 101 to wireless charging mat 102 over a first RF band.

Once first wireless connection 216 is established between IHS 101 and wireless charging mat 102, USB controller or module 306 of wireless charging mat 102 may communicate with USB controller or module 302 of WMD 103 to send an indication of the first information to BT controller or module 304, which may proceed to establish second wireless connection 117 with BT controller or module 205A of IHS 101 over the first RF band.

In some cases, wireless charging mat 102 may send a Distributed Data Management Architecture (DDM) communication to WDM 103 requesting its BT ID. WDM 103 may send the BT ID to wireless charging mat 102, which in turn may forward it to IHS 101. IHS 101 may then select the WDM 103's advertising BT ID that matches the one received from wireless charging mat 102, which allows IHS 101 and WDM 103 to pair automatically and unambiguously.

When second wireless connection 117 is established between IHS 101 and WMD 103, BT controller or module 304 may exchange second information (e.g., a WIFI MAC address, etc.) with BT controller or module 205B of IHS 101 usable to establish third wireless connection 118 over a second RF band.

After third wireless connection 118 is established between WMD 103 and IHS 101, IHS 101 may be able to access devices 105A-C, 107A, and/or 107B coupled to WMD 103 as part of its normal operations.

In some cases, within IHS 101, controllers or modules 205A, 205B, and/or 215 may operate under control of EC/BMC 209. In wireless charging mat 102, controllers or modules 305, 306, and/or 308 may operate under control of SoC 305. And, in WMD 103, controllers or modules 301, 302, and/or 303 may operate under control of SoC 301.

In various implementations, USB controller or modules 302 and 306 may communicate with each other over an Inter-Integrated Circuit ($I^2C$) protocol, or the like. EC/BMC 209 may communicate with wireless charging mat 102 over a USB-Power Delivery (USB-PD) configuration channel (CC) interface, or the like. Also, SoC 301 of WMD 103 may communicate application(s) 311 and/or OS services 312 of IHS 101 through charging mat 102's using Vendor-Defined Messages (VDM), or the like.

Application(s) 311 may include optimization applications and/or wireless dock management applications having an interface handler configured to communicate with BIOS/UEFI 207, which in turn communicates with EC/BMC 209. Application(s) 311 may also include a Software Development Kit (SDK) or Application Programming Interface (API) configured to enable communications between WMD 103 and OS service(s) 310.

Figure 4:
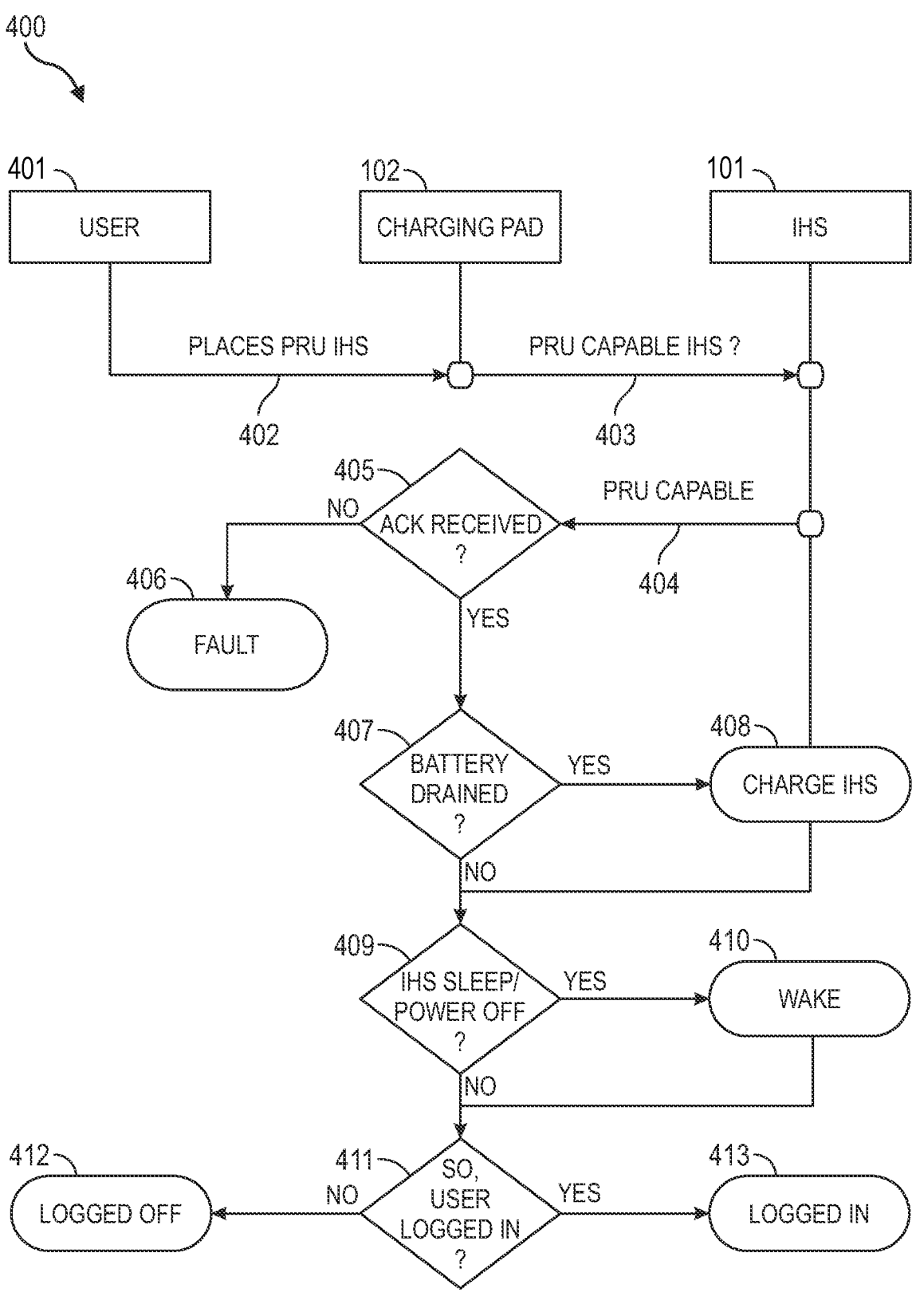
FIG. 4 is a flowchart illustrating an example of a method for connecting an IHS with a wireless charging mat, according to some embodiments.

FIG. 4 is a flowchart illustrating an example of method 400 for connecting IHS 101 to wireless charging mat 102. In some embodiments, method 400 may be performed, at least in part, through cooperation among various components of system 300.

Through method 400, user 401 may place IHS 101 on wireless charging mat 102, and mat 102 may send a Qi protocol request or the like to determine whether the sensed object includes PRU 215. If so, IHS 101 may send a Qi protocol acknowledgment (ACK) response (whereas any other object would send no response and produce a fault). Then, wireless charging mat 102 may send a wake packet to EC/BMC 209 through PTU 307 and PRU 215 to wake IHS 101, which may proceed to enter its working state (e.g., S0).

At 402, user 401 may place PRU 215 of IHS 101 atop or in proximity to PTU 307 wireless charging mat 102. At 403, wireless charging mat 102 may determine whether IHS 101 is PRU capable. If so, at 404 IHS 101 may send a message to wireless charging mat 102 indicating an acknowledgement.

If an acknowledgement is not received at 405, then at 406 wireless charging mat 102 may identify a fault, or a Foreign Object Detection (FOD).

Conversely, if an acknowledgement is received from IHS 101 at 405, then at 407 wireless charging mat 102 may determine whether battery 216 is charged or drained (e.g., it's state of charge is at a selected level). If battery 216 is deemed to be drained, then at 408 wireless charging mat 102 may charge it. Otherwise, at 409, wireless charging mat 102 may determine whether IHS 101 is in a sleep, standby, or powered off state. If so, at 410, wireless charging mat 102 may wake IHS 101 at 410.

At 411, wireless charging mat 102 may determine whether IHS 101 is in an S0 state (i.e., "awake" or "working" state). If not, wireless charging mat 102 may determine that user 401 is logged off at 412. If so, then wireless charging mat 102 may determine that user 401 is logged in at 413.

FIG. 5 is a flowchart illustrating an example of method 500 for automatically pairing IHS 101 with a selected one of a plurality of WMDs 103 in shared work environment 100. In some embodiments, method 400 may be performed, at least, in part, through cooperation among various components of system 300, for example, upon completion of method 400.

At 501, IHS 101 and wireless charging mat 102 may perform first wireless communication 215 to exchange first information (e.g., a BT address or device identifier). At 502, IHS 101 and wireless charging mat 102 may establish second wireless communication 216 over a first RF band (e.g., at BT band) distinct from the power band based, at least in part, upon the first information.

At 503, wireless charging mat 102 may perform a wired (or wireless) communication with WMD 103 to receive second information (e.g., BT address or device identifier associated with WMD 103). At 504, wireless charging mat 102 may transmit the second information to IHS 101 over the first RF band.

For example, SoC 301 of WMD 103 may pass BT_AD-DRESS of the BT controller sending advertisement packets to its internal EC (not shown). The WMD's SoC 301 may pass the BT_ADDRESS to DE USB controller 302 as a DDM Message (e.g., I2C tunneled over USB). A PD controller (e.g., within SoC 301) may pass the BT_ADDRESS to PTU 307, which in response may send a wake event to PRU 215.

In IHS 101, EC/BMC 209 may read the BT_UUD and pass it to BIOS/UEFI 207 as an Advanced Configuration and Power Interface (ACPI) ACPI System Control Interrupt (SCI), which in turn may generate a management event (e.g., a WINDOWS management event or "WMI") reaching applications 301 and/or OS service(s) 312. At last, OS service(s) 312 may use the BT_ADDRESS receipt as the user's consent to connect, and it may instruct other services to pair with the matching BT device—that is, WMD 103.

At 505, IHS 101 and WMD 103 may establish third wireless communication 117 over the first RF band to exchange third information (e.g., a WIFI address or WIFI device identifier associated with IHS 101 and/or a WIFI address or WIFI identifier associated with WMD 103).

At 506, IHS 101 and WMD 103 may establish a high-bandwidth wireless connection 118 over a second RF band (e.g., a WIFI band). In some cases, wireless connection 118 may be usable by IHS 101 to receive video signals from webcam 105A, transmit video signals to displays 105B and 105C, to communicate with user input devices 107A and 107B, and/or to access network 112 via AP 109.

As such systems and methods described herein enable a wireless connection between IHS 101 and WMD 103 in a shared workspace with unambiguous pairing processes between them (through the use of wireless charging mat 102). In some implementations, the only actions performed by user 401 are to place IHS 101 on mat 102, optionally login, and begin work.

After user 401 places IHS 101 on wireless charging mat 102, WMD 103 and IHS 101 auto-pair and the IHS's screen may be extended onto displays 105B and/or 105C connected to WMD 103, while peripherals 107A and 107B are ready to be operated by user 401. At this point, if user 401 has not previously logged in, they may login using peripherals 107A and 107B.

It should be noted that these systems and methods support IHS 101 in any power state, such as: S0, Modern Standby, hibernate, or G3, and even a battery fully drained, power off state. Additionally, or alternatively, the lid of IHS 101 may be closed.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination of thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
an Embedded Controller (EC);

a Power Receiving Unit (PRU) configured to wirelessly receive power from a Power Transmission Unit (PTU) of a charging mat; and a memory coupled to the EC, the memory having program instructions stored thereon that, upon execution by the EC, cause the IHS to:

in response to the PRU receiving an initial wireless communication from the PTU of the charging mat over a power band usable by the charging mat to charge a battery internal to the IHS, establish a first wireless communication with a Workspace Managing Device (WMD) coupled to the charging mat, wherein the first wireless communication is over a first Radio Frequency (RF) band that is distinct from the power band; and based on information received over the first wireless communication, establish a second wireless connection with the WMD, wherein the second wireless communication is over a higher-bandwidth data connection than the first wireless communication, and wherein the second wireless communication is over a second RF band that is distinct from the power band and from the first RF band.

2. The IHS of claim 1, wherein the initial wireless communication comprises a BLUETOOTH address or device identifier for establishing the first wireless communication.

3. The IHS of claim 1, wherein the initial wireless communication is based on a Qi protocol.

4. The IHS of claim 1, wherein the first RF band comprises a BLUETOOTH frequency band.

5. The IHS of claim 1, wherein the first wireless communication includes a WIFI address for establishing the second wireless communication.

6. The IHS of claim 1, wherein the initial wireless communication includes a BLUETOOTH address or device identifier associated with the WMD.

7. The IHS of claim 1, wherein the first RF band comprises a WIFI frequency band.

8. The IHS of claim 1, wherein the information received over the first wireless communication comprises at least one of: (i) a WIFI address or WIFI device identifier associated with the IHS, or (ii) another WIFI address or WIFI device identifier associated with the WMD.

9. The IHS of claim 1, wherein the second RF band comprises a 2.4 GHz frequency band.

10. The IHS of claim 1, wherein the second RF band comprises a 5 GHz frequency band.

11. The IHS of claim 1, wherein the second wireless connection is usable to transmit video from the IHS to the WMD.

12. A memory device having program instructions stored thereon that, upon execution by a processor of a Workspace Managing Device (WMD), cause the WMD to:

in response to an initial wireless connection between a Power Transmission Unit of a charging mat coupled to the WMD and a Power Receiving Unit of an Information Handling System (IHS) disposed in proximity to the charging mat, establish a first wireless connection over a first Radio Frequency (RF) band with the IHS, wherein the initial wireless communication is performed over a power band usable by the charging mat to charge a battery internal to the IHS, and wherein the first RF band is distinct from the power band; and based on information received over the first wireless communication, establish a second wireless connection with the IHS over a second RF band, wherein the second wireless connection is a higher bandwidth connection that the first wireless connection, and wherein the second RF band is distinct from the first RF band and from the power band.

13. The memory device of claim 12, wherein the initial wireless connection communicates information comprising at least one of: (i) a BLUETOOTH address or device identifier associated with the IHS, or (ii) another BLUETOOTH address or device identifier associated with the WMD.

14. The memory device of claim 12, wherein the first wireless connection communicates information comprising at least one of: (i) a WIFI address or WIFI device identifier associated with the IHS, or (ii) another WIFI address or WIFI device identifier associated with the WMD.

15. The memory device of claim 12, wherein the second wireless connection is usable to transmit a video signal received from the HIS to a display coupled to the WMD.

16. A method, comprising:

in response to a Power Receiving Unit of an Information Handling System (IHS) receiving an initial wireless communication from a Power Transmission Unit of a charging mat over a power band usable by the charging mat to charge a battery internal to the IHS, establishing, via the IHS, a first wireless communication with a Workspace Managing Device (WMD) coupled to the charging mat, wherein the first wireless communication is over a first Radio Frequency (RF) band that is distinct from the power band, and based on information received over the first wireless communication, establishing, via the IHS, a second wireless connection with the WMD, wherein the second wireless communication is over a higher-bandwidth data connection than the first wireless communication.

\* \* \* \* \*